(12) United States Patent
Tsai et al.

(10) Patent No.: US 10,091,062 B2
(45) Date of Patent: Oct. 2, 2018

(54) MULTIPLE MOBILITY DOMAINS WITH VLAN TRANSLATION IN A MULTI-TENANT NETWORK ENVIRONMENT

(71) Applicant: CISCO TECHNOLOGY, INC., San Jose, CA (US)

(72) Inventors: Chiajen Tsai, Cupertino, CA (US); Yibin Yang, San Jose, CA (US); Patnala Debashis Rao, Cupertino, CA (US); Manish Chandra Agrawal, San Jose, CA (US); Rick Chang, Santee, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 102 days.

(21) Appl. No.: 15/074,906

(22) Filed: Mar. 18, 2016

(65) Prior Publication Data

US 2016/0204986 A1 Jul. 14, 2016

Related U.S. Application Data

(63) Continuation of application No. 14/334,413, filed on Jul. 17, 2014, now Pat. No. 9,313,044.

(51) Int. Cl.
*H04J 11/00* (2006.01)
*H04L 12/24* (2006.01)
(Continued)

(52) U.S. Cl.
CPC ...... *H04L 41/0823* (2013.01); *G06F 9/45558* (2013.01); *H04H 20/53* (2013.01); *H04L 12/467* (2013.01); *H04L 12/4675* (2013.01); *G06F 2009/45595* (2013.01); *H04L 12/4641* (2013.01)

(58) Field of Classification Search
CPC ............... H04L 41/0823; H04L 12/467; H04L 12/4675; H04L 12/4641; H04L 41/12; H04L 45/02; H04L 45/04; H04L 47/2491; H04L 49/35
See application file for complete search history.

(56) References Cited

U.S. PATENT DOCUMENTS

6,496,502 B1   12/2002   Fite et al.
7,397,811 B2   7/2008    Green
(Continued)

*Primary Examiner* — Phong La
(74) *Attorney, Agent, or Firm* — Polsinelli PC (57) ABSTRACT

An example method for facilitating multiple mobility domains with VLAN translation in a multi-tenant network environment is provided and includes detecting attachment of a first virtual machine on a first port and a second virtual machine on a second port of a network element, the first port and the second port being configured with a first mobility domain and a second mobility domain, respectively, and the first and second virtual machines being configured on a same original VLAN, determining whether the original VLAN falls within a pre-configured VLAN range, translating the original VLAN to a first VLAN on the first port corresponding to the first mobility domain and to a second VLAN on the second port corresponding to the second mobility domain, and segregating traffic on the original VLAN into the first VLAN and the second VLAN according to the respective mobility domains for per-port VLAN significance.

20 Claims, 6 Drawing Sheets

(51) Int. Cl.
*H04L 12/46* (2006.01)
*G06F 9/455* (2018.01)
*H04H 20/53* (2008.01)

(56) References Cited

U.S. PATENT DOCUMENTS

| | | | | |
|---|---|---|---|---|
| 7,499,456 | B2* | 3/2009 | De Silva | H04L 47/2491 370/392 |
| 7,830,892 | B2* | 11/2010 | Kalkunte | H04L 12/4645 370/395.53 |
| 8,194,674 | B1* | 6/2012 | Pagel | H04L 12/4641 370/393 |
| 8,369,344 | B1* | 2/2013 | Krishnan | H04L 63/0236 370/389 |
| 9,160,633 | B1* | 10/2015 | Ruble | H04L 47/20 |
| 9,203,775 | B2* | 12/2015 | Mulligan | G06F 9/45533 |
| 9,313,044 | B2 | 4/2016 | Tsai et al. | |
| 2002/0174307 | A1* | 11/2002 | Yoshida | G06F 3/0605 711/148 |
| 2003/0152075 | A1* | 8/2003 | Hawthorne, III | H04L 12/4641 370/389 |
| 2004/0032868 | A1* | 2/2004 | Oda | H04L 12/4641 370/389 |
| 2005/0076143 | A1* | 4/2005 | Wang | H04L 41/12 709/245 |
| 2005/0175022 | A1* | 8/2005 | Nishimura | H04L 12/4625 370/401 |
| 2007/0242602 | A1* | 10/2007 | Pang | H04L 12/462 370/216 |
| 2008/0084888 | A1* | 4/2008 | Yadav | H04L 45/36 370/395.31 |
| 2010/0091681 | A1* | 4/2010 | Sonoda | H04L 12/4641 370/252 |
| 2010/0169467 | A1* | 7/2010 | Shukla | H04L 49/70 709/220 |
| 2010/0290396 | A1* | 11/2010 | Karunakaran | H04L 12/467 370/328 |
| 2011/0004913 | A1* | 1/2011 | Nagarajan | H04L 63/102 726/1 |
| 2011/0246669 | A1* | 10/2011 | Kanada | G06F 9/4856 709/238 |
| 2012/0147894 | A1* | 6/2012 | Mulligan | G06F 9/45533 370/395.53 |
| 2012/0230223 | A1* | 9/2012 | Taguchi | H04L 12/4641 370/254 |
| 2012/0300675 | A1* | 11/2012 | Uppalli | H04L 12/4625 370/256 |
| 2012/0303767 | A1* | 11/2012 | Renzin | H04L 41/08 709/220 |
| 2012/0331142 | A1* | 12/2012 | Mittal | H04L 49/354 709/225 |
| 2013/0034015 | A1* | 2/2013 | Jaiswal | H04L 12/4641 370/254 |
| 2013/0044636 | A1* | 2/2013 | Koponen | H04L 47/12 370/254 |
| 2013/0044641 | A1* | 2/2013 | Koponen | H04L 12/66 370/255 |
| 2013/0103817 | A1* | 4/2013 | Koponen | G06F 9/45558 709/223 |
| 2013/0163606 | A1* | 6/2013 | Bagepalli | H04L 49/356 370/409 |
| 2013/0315252 | A1* | 11/2013 | Emmadi | H04L 12/4641 370/395.53 |
| 2013/0343385 | A1* | 12/2013 | Benny | H04L 45/64 370/392 |
| 2014/0071983 | A1* | 3/2014 | Banavalikar | H04L 45/72 370/389 |
| 2014/0223434 | A1* | 8/2014 | Mulligan | G06F 9/45533 718/1 |
| 2014/0269648 | A1* | 9/2014 | Unnimadhavan | H04W 8/12 370/338 |
| 2015/0103692 | A1* | 4/2015 | Jain | H04L 41/0806 370/254 |
| 2015/0312049 | A1* | 10/2015 | Duda | H04L 49/40 370/390 |

\* cited by examiner

MULTIPLE MOBILITY DOMAINS WITH VLAN TRANSLATION IN A MULTI-TENANT NETWORK ENVIRONMENT

RELATED APPLICATION

This Application is a continuation (and claims the benefit of priority under 35 U.S.C. § 120) of U.S. application Ser. No. 14/334,413, filed Jul. 17, 2014, entitled "MULTIPLE MOBILITY DOMAINS WITH VLAN TRANSLATION IN A MULTI-TENANT NETWORK ENVIRONMENT," INVENTORS CHIAJEN TSAI, ET AL. The disclosure of the prior application is considered part of (and are incorporated by reference in) the disclosure of this application.

TECHNICAL FIELD

This disclosure relates in general to the field of communications and, more particularly, to multiple mobility domains with virtual local area network (VLAN) translation in a multi-tenant network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Massively scalable data center (MSDC) is a large data center with more than a thousand servers that is designed to scale in size and computing capacity with little impact on existing infrastructure. MSDCs involve data center consolidation, server virtualization, and security. Most large enterprise-class data centers use MSDC concepts to reduce both capital expenditures and operating expenses and to shorten time to deployment. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating multiple mobility domains with VLAN translation in a multi-tenant network environment is provided and includes detecting attachment of a first virtual machine on a first port and a second virtual machine on a second port of a network element, the first port and the second port being configured with a first mobility domain and a second mobility domain, respectively, and the first and second virtual machines being configured on a same original VLAN, determining whether the original VLAN falls within a pre-configured VLAN translation range, and if the original VLAN falls within the pre-configured VLAN translation range, translating the original VLAN to a first VLAN on the first port corresponding to the first mobility domain and to a second VLAN on the second port corresponding to the second mobility domain, and segregating (e.g., separating, differentiating, splitting, etc.) traffic on the original VLAN into the first VLAN and the second VLAN according to the respective mobility domains for per-port VLAN significance.

As used herein, the term "mobility domain" comprises a scope (e.g., logical abstraction) within which a virtual machine can be moved (e.g., a specific virtual machine can be moved from one server to another within the same mobility domain; the virtual machine cannot be moved between two distinct mobility domains) and under which virtual port groups, port identifiers and/or port profiles have significance. The mobility domain can include an identifier for a set of VLANs, and may comprise any suitable identifier within which the set of VLANs are scoped. Any one VLAN can span multiple mobility domains; and each mobility domain in the network may include more than one VLAN.

Example Embodiments

Figure 1:
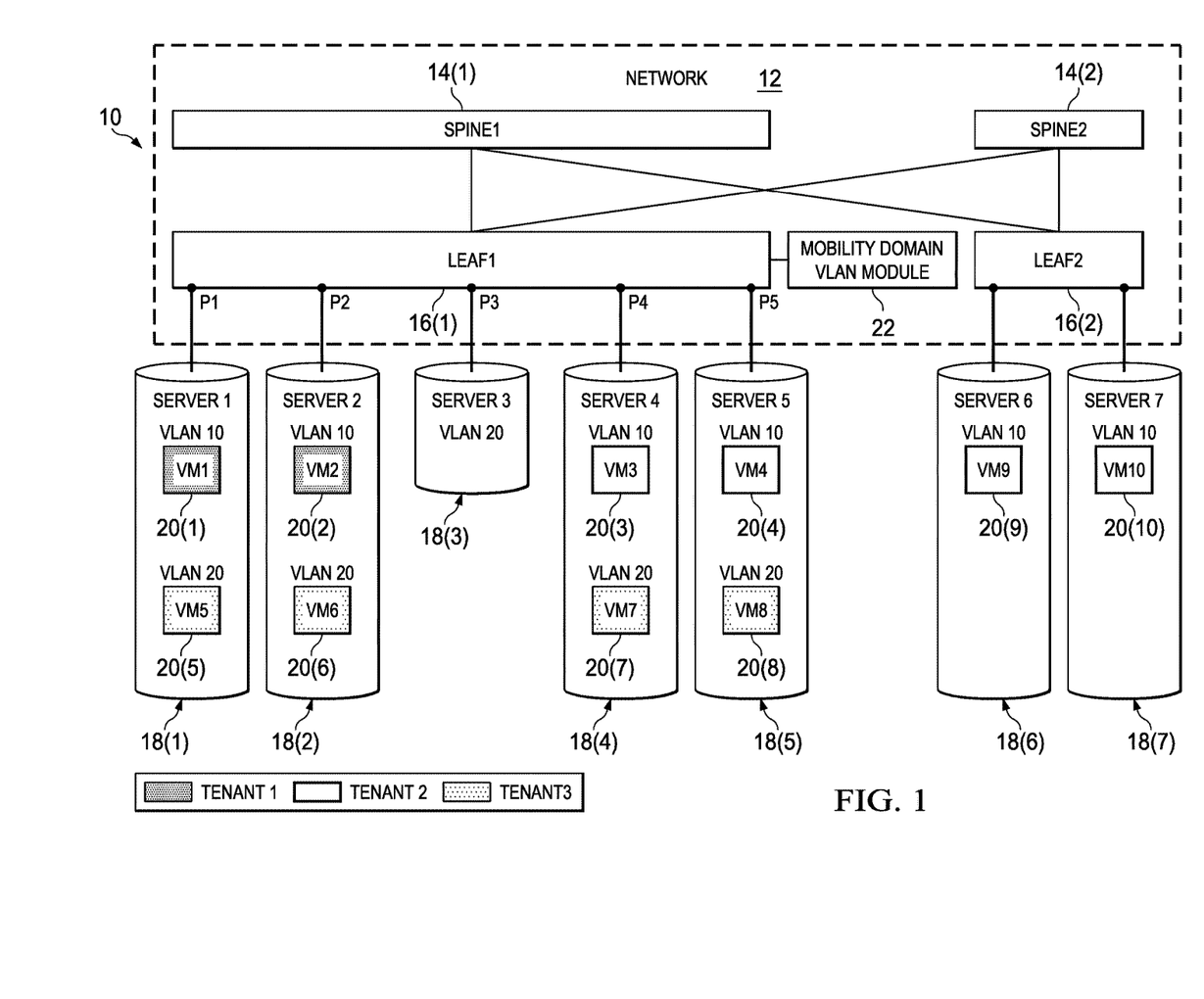
FIG. 1 is a simplified block diagram illustrating a communication system for facilitating multiple mobility domains with VLAN translation in a multi-tenant network environment.

Turning to FIG. 1, FIG. 1 is a simplified block diagram illustrating a communication system 10 for facilitating multiple mobility domains with VLAN translation in a multi-tenant network environment in accordance with one example embodiment. FIG. 1 illustrates a network 12 comprising a plurality of switches, for example, two spine switches, 14(1) and 14(2), and two leaf switches, 16(1) and 16(2). Spine switches 14(1)-14(2) and leaf switches 16(1)-16(2) may comprise identical or similar network elements, and may differ merely in the nature of devices attached to their respective ports. Whereas spine switches 14(1)-14(2) connect with leaf switches 16(1)-16(2) on their respective ports, a plurality of servers 18(1)-18(7) may be connected to leaf switches 16(1)-16(2) on their respective ports; for example, servers 18(1)-18(5) are connected to leaf switch 16(1) via ports P1, P2, P3, P4 and P5, respectively.

Each server may host one or more virtual machines, which may be owned or operated by separate tenants. For example, virtual machines 20(1) and 20(2) belong to tenant 1 and run on servers 18(1) and 18(2), respectively; virtual machines 20(3) and 20(4) belong to tenant 2 and run on servers 18(4) and 18(5), respectively. Tenant 3 has four virtual machines, 20(5), 20(6), 20(7) and 20(8) that run on servers 18(1), 18(2), 18(4) and 18(5), respectively. In addition, tenant 3 controls a bare metal physical server, 18(3), connected to leaf switch 16(1). Servers 18(6) and 18(7) are connected to leaf switch 16(2). Server 18(6) hosts virtual machine 20(9); server 18(7) hosts virtual machine 20(10); both virtual machines 20(9) and 20(10) are controlled by tenant 2.

One or more of the virtual machines and network elements may be included in a separate VLAN, for example, VLAN 22(1) and 22(2). As used herein, the term "VLAN" comprises a network segment that encompasses a distinct broadcast domain in a Layer 2 network; different VLANs are mutually isolated so that packets can only pass between them via one or more routers, on a Layer 3 (or higher) protocol. Layer 2 and Layer 3 refer to network layers in the Open Systems Interconnect (OSI) Network Model. The VLAN is similar to a physical local area network (LAN); it differs in allowing end stations to be grouped together more easily even if they are not on the same network switch. VLAN membership can be configured through software instead of physically relocating devices or connections. To physically replicate the functions of a VLAN would require a separate, parallel collection of network cables and equipment separate from the primary network. From an implementation point of view, separating ports on a switch by VLAN groups separates traffic from various devices in a manner similar to connecting the devices to another, distinct switch of their own (associated with the separate port groupings). For example, virtual machines 20(1)-20(4), 20(9) and 20(10) may be part of VLAN 22(1) (e.g., VLAN 10); virtual machines 20(5)-20(8) and server 18(3) may be part of VLAN 20.

Note that the number of switches, servers, virtual machines, tenants, VLANs and other elements of communication system 10 shown in the FIGURE is merely for ease of illustration, and is not intended to be limiting in any sense. Any number of such and other elements may be included within communication system 10 within the broad scope of the embodiments.

Each leaf switch (e.g., 16(1)) may be configured with a mobility domain VLAN module 22 that can support multiple mobility domains with various features, such as mobility domain scoped VLAN translation for per-port significant VLANs, mobility domain specific virtual port instantiation, VLAN differentiation in profile handling, and VLAN translation range for co-existence of per-port and per-device significant VLANs.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Cisco® Vinci™, also known as Dynamic Fabric Automation (DFA) is a network architecture that can meet performance demands of MSDCs. Vinci's physical topology is based on a two-tier fat tree, also called Clos network, where each leaf switch or router connects to each spine switch or router and vice versa. In Vinci, border gateway protocol (BGP) is employed to support host route distribution among leafs, via route reflector. To support data forwarding, two overlay schemes, FabricPath and virtual extensible local area network (VXLAN), can be used.

Simplified fabric management and automatic provisioning are some of the advantages of Vinci. Data Center Network Management (DCNM) offers a central point of management for ease of operation for fabric management and automatic provisioning. A three-level hierarchy is used in DCNM to facilitate automatic provisioning: (i) DCNM organization, (ii) DCNM partition and (iii) DCNM network. A Vinci Internet Protocol (IP) fabric may host one or more DCNM organizations. Each DCNM organization may consist of one or more DCNM partitions. Within each DCNM partition, one or more DCNM networks may be configured.

A specific DCNM network can be identified by a combination of a mobility domain identifier (ID) and a VLAN ID. In currently existing technologies, a single leaf switch can be configured with only one mobility domain. Therefore, in the leaf switch, a specific VLAN can only be associated with one DCNM network because the DCNM network is identified by the mobility domain ID and the VLAN ID. To support auto-configuration, the DCNM network is associated with a profile, whose configuration can be applied when the DCNM network is instantiated on a leaf switch after detecting a new tenant.

Vinci also supports multi-tenancy. Multi-tenancy refers to an architecture in which a single instance of a software application serves multiple customers. Each customer is called a "tenant." Tenants can comprise organizations, individuals, associations, etc. Tenants may be given the ability to customize some parts of the application, such as color of the user interface or business rules. For example, a software-as-a-service (SaaS) provider can run one instance of an application on one instance of a database and provide web access to multiple tenants; each tenant's data is isolated and remains invisible to other tenants. In the multi-tenant architecture, the software application is designed to virtually partition its data and configuration, and each tenant works with a customized virtual application.

A lightweight approach for multi-tenancy support provides for a segmentation ID as an attribute for a VLAN. Virtual network VN-Segmentation [VN-Segment] is a feature in Vinci for supporting scalable multi-tenancy. VN-Segment specifies a 24-bit segment-ID used to identify a specific tenant globally within the network, thereby enabling network support for larger scale of VLANs using the same technology. The VN-segment-ID is used for segregating and forwarding traffic for a Layer-2 virtual network, and for distinguishing Layer-3 tenants at the leaf switches. For a host facing port on the leaf switch, a VN-Segment instance can be tied to a specific VLAN through a virtual port (VP). In other words, there is no need to specify a service instance on a <port, VLAN> basis and existing VLAN infrastructure can be reused.

Moreover, a given virtual data center (e.g. Vmware® vCenter™) may have up to 4,096 VLANs, but there can exist multiple linked vCenters with duplicate VLAN IDs. For example, a tenant network with a given subnet may run out of VLANs, and a linked vCenter with a new pool of 4,096 VLANs may be created. The same network segment may be extended across multiple vCenters because the first vCenter ran out of resources. Even though the two vCenters are linked together, due to mobility domain movement constraints, a given virtual machine may be moved only within one vCenter. The mobility domain's movement constraints may be imposed by logical clusters/groups of VLANs created at the orchestrator (i.e. a virtual machine may not be able to be moved outside of a logical grouping of VLANs defined at the orchestrator).

In some scenarios, virtual machines of different tenants may want to use the same VLAN for frame encapsulation. For example, virtual machines 20(1) and 20(2) of tenant 1 may use VLAN 10 for encapsulation; virtual machines 20(3) and 20(4) of tenant 2 may also use VLAN 10. However, in currently existing network infrastructure, VLANs of disparate tenants may not use the same VLAN and be attached to the same leaf switch because VLANs have per-device significance (e.g., relative to the leaf switch, where one leaf switch may be configured with only one VLAN specific to a particular mobility domain) and therefore traffic of tenants 1 and 2 cannot be segregated as desired. Enhancements to the existing VLAN infrastructure are needed to introduce per-port significance for VLANs, rather than per-device significance.

To support per-port significant VLAN, a particular VLAN should be able to associate with different DCNM networks on different ports of the same leaf switch, which may be not be possible in currently existing technologies. Traffic of a specific VLAN (e.g., VLAN 10) on different ports (e.g., P1, P4) may belong to different broadcast domains only if the VLAN has per-port significance (e.g., broadcast domains identified by a specific combination of VLAN and port on the leaf switch). In a switch with explicit bridge domain support, traffic may be mapped on different ports to different bridge domains. However, existing VLAN infrastructure does not support explicit bridge domains.

Moreover, although some VLANs may have per-port significance, other VLANs may still need to maintain per-device significance. These two types of VLANs should be able to co-exist on a same port; however, currently existing network infrastructure does not permit such co-existence. For example, VLAN 20 has per-device significance in leaf switch 16(1) as it is dedicated to virtual machines and the physical server of tenant 3. Therefore, in ports P1, P2, P4 and P5, VLAN 10 of per-port significance should co-exist with VLAN 20 of per-device significance.

Communication system 10 is configured to address these issues (among others) to offer a system and method for facilitating multiple mobility domains with VLAN translation in a multi-tenant network environment. According to various embodiments, mobility domains may be configured in leaf switches 16(1)-16(2) on a port basis. For example, leaf switch 16(1) may be configured with multiple mobility domains: ports P1 and P2 may be configured with mobility domain ID MD1; ports P4 and P5 may be configured with another mobility domain ID MD2; ports P1-P5 may be configured with yet another mobility domain ID MD0. Thus, each port P1-P5 on leaf switch 16(1) may be configured with one or more mobility domains.

VLAN translation may be used to segregate traffic of the same VLAN (e.g., VLAN 10) on different ports (e.g., P1, P4). For example, a particular VLAN (e.g., VLAN 10) may be translated to one VLAN (e.g., VLAN 100) on ports (e.g., P1, P2) belonging to one mobility domain (e.g., MD1) and to another VLAN (e.g., VLAN 101) on ports (e.g., P4, P5) belonging to another mobility domain (e.g., MD2). Thus, VLAN translation may be scoped by mobility domain, as DCNM networks are identified by mobility domain IDs in addition to VLAN IDs. After an original VLAN (e.g., VLAN 10) is mapped into a translated VLAN (e.g., VLAN 100) on a particular port (e.g., P1), the translated VLAN may be used for control and data forwarding.

Assume, merely for the sake of illustration, and not as a limitation, that mobility domain VLAN module 22 executing at leaf switch 16(1) detects attachment of virtual machine 20(1) (owned by tenant 1) on port P1 (configured with mobility domain MD1) tagged with original VLAN 10; and virtual machine 20(4) (owned by tenant 2) on port P4 (configured with mobility domain MD2) tagged with original VLAN 10. Virtual machines 20(1) and 20(4) may be configured separately and independently on the same original VLAN 10 (e.g., by respective tenants 1 and 2). Mobility domain VLAN module 22 determines whether original VLAN 10 falls within a pre-configured VLAN range, and if so, mobility domain VLAN module 22 translates original VLAN 10 to a first VLAN (e.g., VLAN 100) on port P1 corresponding to mobility domain MD1 and to a second VLAN (e.g., VLAN 101) on port P4 corresponding to mobility domain MD2, and segregates traffic on original VLAN 10 into first VLAN 100 and second VLAN 101 according to the respective mobility domains for per-port VLAN significance.

In some embodiments, mobility domain VLAN module 22 may identify the associated DCNM network of the detected tenant (e.g., tenant 1 in the case of VM 20(1)) through the mobility domain of the port (e.g., P1) and the VLAN (e.g., VLAN 10) used to tag the frame. The profile of the DCNM network can be suitably retrieved. Typically, the profile contains command line interface (CLI) commands to create VLANs and switch virtual interfaces (SVIs). The CLI commands may be parameterized with the appropriate VLAN for virtual port instantiation and other functions. Embodiments of communication system 10 may parameterize the CLI commands with the translated VLAN, although the original VLAN may be used to retrieve the profile. Thus, although the DCNM network and profile are identified by the mobility domain ID and the original VLAN ID, control and data traffic flow according to the translated VLAN. Thus, VLAN differentiation may be implemented during profile retrieval and parameterization. The original VLAN may be used in profile retrieval and the translated VLAN may be used profile parameterization so that the VLAN and SVI are created for the translated VLAN.

Turning back to the example, mobility domain VLAN module 22 may retrieve a profile based on a combination of mobility domain MD1 and original VLAN 10, parameterize the profile with translated first VLAN 100, and instantiate the first VLAN 100 on port P1 with the parameterized profile. Mobility domain VLAN module 22 may retrieve another profile based on a combination of mobility domain MD2 and original VLAN 10, parameterize the profile with the second VLAN 101, and instantiate the second VLAN on port P4 with the parameterized profile.

The translated VLANs may be created to carry traffic for the corresponding DCNM networks of the mobility domains; the translated VLANs may not flood traffic out of ports of other mobility domains that belong to other DCNM networks. By default, virtual ports of the translated VLAN may be instantiated on all trunk ports (e.g., a trunk port is a port that is assigned to carry traffic for all the VLANs that are accessible by a specific switch, a process known as trunking). According to various embodiments, when the translated VLAN is created, its virtual ports may be instantiated on ports of the specific mobility domain associated with the translated VLAN. Thus, virtual ports may not be instantiated on ports of other mobility domains.

For example, mobility domain VLAN module 22 may instantiate a first set of virtual ports on substantially all ports (e.g., P1, P2) configured with mobility domain MD1 that segregates traffic at the corresponding ports according to first VLAN 100. Broadcast traffic on original VLAN 10 received at any of the first set of virtual ports may be forwarded to substantially all others of the first set of virtual ports. Similarly, mobility domain VLAN module 22 may also instantiate a second set of virtual ports on substantially all ports (e.g., P4, P5) configured with mobility domain MD2 that segregates traffic at the corresponding ports according to second VLAN 101. Broadcast traffic on original VLAN 10 received at any of the second set of virtual ports may be forwarded to substantially all others of the second set of virtual ports.

In various embodiments, the VLAN translation range may be specified to distinguish VLANs that may be translated from those that may not be translated. Thus, VLANs with per-port significance may be translated and included in the VLAN translation range; VLANs with per-device significance may not be translated and may be excluded from the VLAN translation range. The VLAN translation range may be specified to subject VLANs in the translation range to translation on a port; VLANs out of the translation range may not be subject to translation and can therefore still maintain per-device significance.

Assume, merely for the sake of illustration, and not as a limitation, that VLAN 20 is not included in the pre-configured VLAN translation range. Mobility domain VLAN module 22 executing at leaf switch 16(1) detects attachment of virtual machine 20(5) (owned by tenant 3) on port P1 (configured with mobility domain MD1) tagged with original VLAN 20. As original VLAN 20 does not fall within the preconfigured VLAN translation range, mobility domain VLAN module 22 may instantiate virtual ports corresponding to original VLAN 20 on substantially all ports (e.g., P1, P2, P3, P4, P5) of leaf switch 16(1), and broadcast traffic on original VLAN 20 to substantially all such virtual ports.

Thus, if a packet arrives at port P1 from virtual machine 20(1), the packet may be identified as arriving at the virtual port corresponding to original VLAN 10 and mobility domain MD1. Correspondingly, mobility domain VLAN module 22 may translate original VLAN 10 to first VLAN 100, and broadcast the packet to other virtual ports (in this case instantiated on ports P1 and P2) corresponding to first VLAN 100. Similarly, if the packet arrives at port P5 from virtual machine 20(4), the packet may be identified as arriving at the virtual port corresponding to original VLAN 10 and mobility domain MD2. Correspondingly, mobility domain VLAN module 22 may translate original VLAN 10 to second VLAN 101, and broadcast the packet to other virtual ports (in this case instantiated on ports P4 and P5) corresponding to first VLAN 101.

On the other hand, if the packet arrives at port P1 from virtual machine 20(5), the packet may be identified as arriving at the virtual port corresponding to original VLAN 20 with a default mobility domain (e.g., MD0). Correspondingly, mobility domain VLAN module 22 may perform no translation, and instead broadcast the packet to other virtual ports (in this case instantiated on ports P1-P5) corresponding to original VLAN 20. Note that mobility domain VLAN module 22 may be implemented in substantially all leaf switches 16(1)-16(2) in network 12. Note also that each mobility domain may be mapped to a separate tenant of network 12.

Embodiments of communication system 10 can allow multiple tenants connected to the same leaf switch to share the same VLAN, allowing existing behavior of per-device VLANs to remain unchanged, with no change to DCNM networks and profile contents. Auto-configuration solution of Vinci may be enhanced to allow flexible multi-tenant layer with VLAN translations and decoupling of control and forwarding to better serve customer needs. Embodiments of communication system 10 can facilitate competitive advantage over existing IP overlay offerings through simplified VLAN translation with lightweight multi-tenant infrastructure.

Turning to the infrastructure of communication system 10, the network topology of network 12 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, mobility domain VLAN module 22 may be implemented as a combination of hardware and software in the respective leaf switches (e.g., 16(1), 16(2)). In some embodiments, mobility domain VLAN module 22 may be implemented exclusively as hardware, and in some other embodiments, exclusively as software. In some other embodiments, mobility domain VLAN module 22 may be implemented in an external appliance (e.g., server) and suitably attached to corresponding leaf switches 16(1)-16(2). Note that the switches (e.g., spine switches 14(1)-14(2), leaf switches 16(1) 16(2)) may comprise any suitable network element capable of performing network switching operations.

As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, leaf switches 16(1)-16(2) may comprise Top-Of-Rack (ToR) switches and may include fabric extenders and other networking components.

The various servers 18(1)-18(7) may comprise rack servers, blade servers, bare-metal servers, etc. configured with suitable hypervisors and other software components to facilitate executing one or more virtual machines thereon. Each virtual machine may be configured to a specific VLAN, tenant, mobility domain, etc., for example, by a network administrator, tenant administrator, tenant operator, etc. The configuration may be effected manually or automatically within the broad scope of the embodiments.

Figure 2:
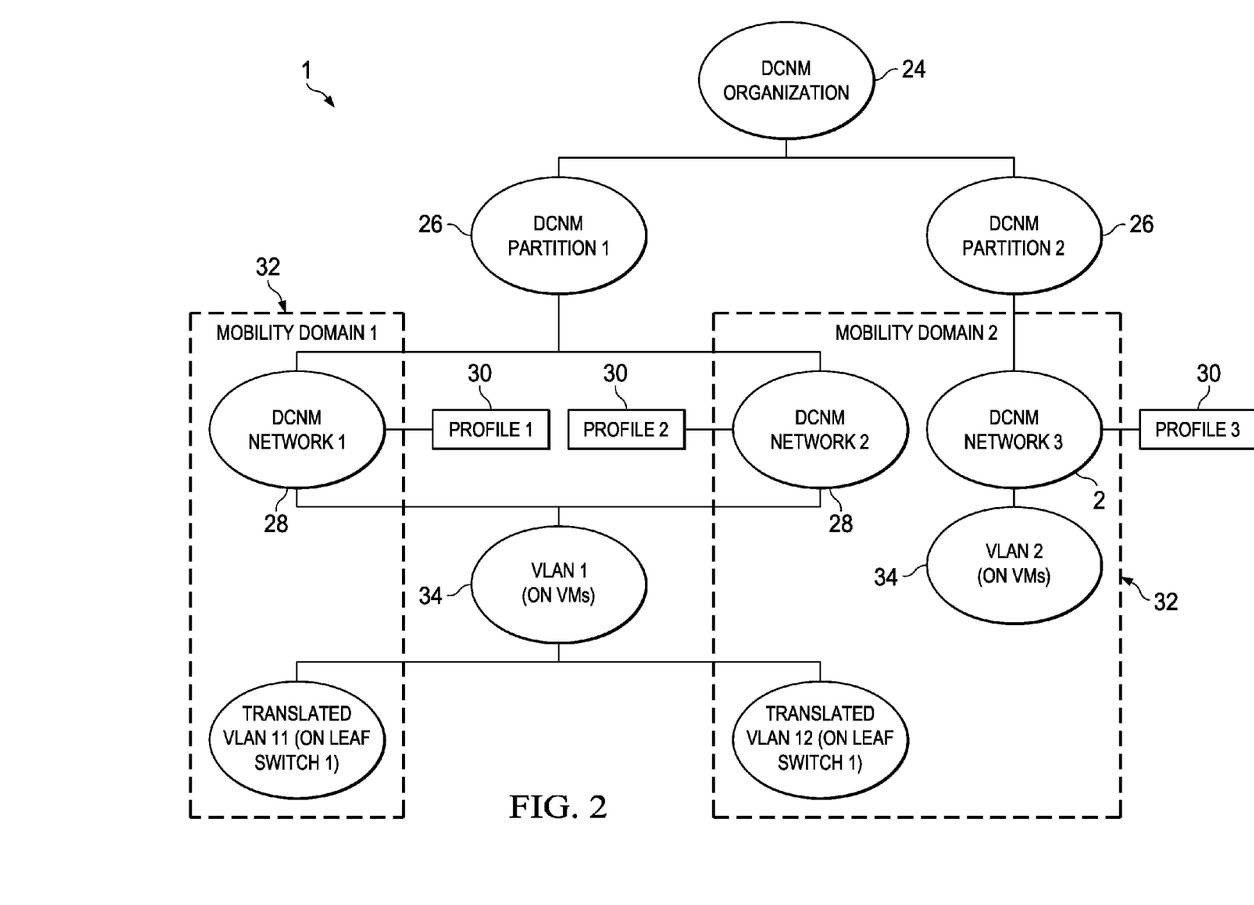
FIG. 2 is a simplified block diagram illustrating example details of embodiments of the communication system.

Turning to FIG. 2, FIG. 2 is a simplified block diagram illustrating an example logical view of network 12 according to an embodiment of communication system 10. Network 12 may be logically partitioned into one or more DCNM organization(s) 24. Each DCNM organization 24 may be partitioned into one or more DCNM partition(s) 26. Each DCNM partition 26 may be further partitioned into one or more DCNM network(s) 28 (e.g., DCNM network 1, DCNM network 2, DCNM network 3). Each DCNM network 28 may be associated with a profile 30 (e.g., profile 1 associated with DCNM network 1; profile 2 associated with DCNM network 2; etc.). Each profile 30 may specify configuration parameters for leaf switches to be associated with corresponding DCNM network 28.

Each DCNM network 28 may be identified by a specific combination of mobility domain ID and VLAN ID. Network 12 may be logically partitioned into mobility domains 32 and VLANs 34 at the virtual machines. For example, VMs in mobility domain 1 and VLAN 1 (configured at the VMs) may belong to DCNM network 1; VMs in mobility domain 2 and VLAN 1 (configured at the VMs) may belong to DCNM network 2; VMs in mobility domain 2 and VLAN 2 (configured at the VMs) may belong to DCNM network 3.

According to various embodiments, VLAN 1 of mobility domain 1 may be translated to VLAN 11 at ports in the leaf switch to which DCNM network 1 is attached; similarly, VLAN 1 of mobility domain 2 may be translated to VLAN 12 at ports in the leaf switch to which DCNM network 2 is attached. Thus, each leaf switch may be configured with more than one DCNM network (e.g., multiple mobility domains and VLANs), and may be configured to appropriately segregate packets of separate DCNM networks.

Figure 3:
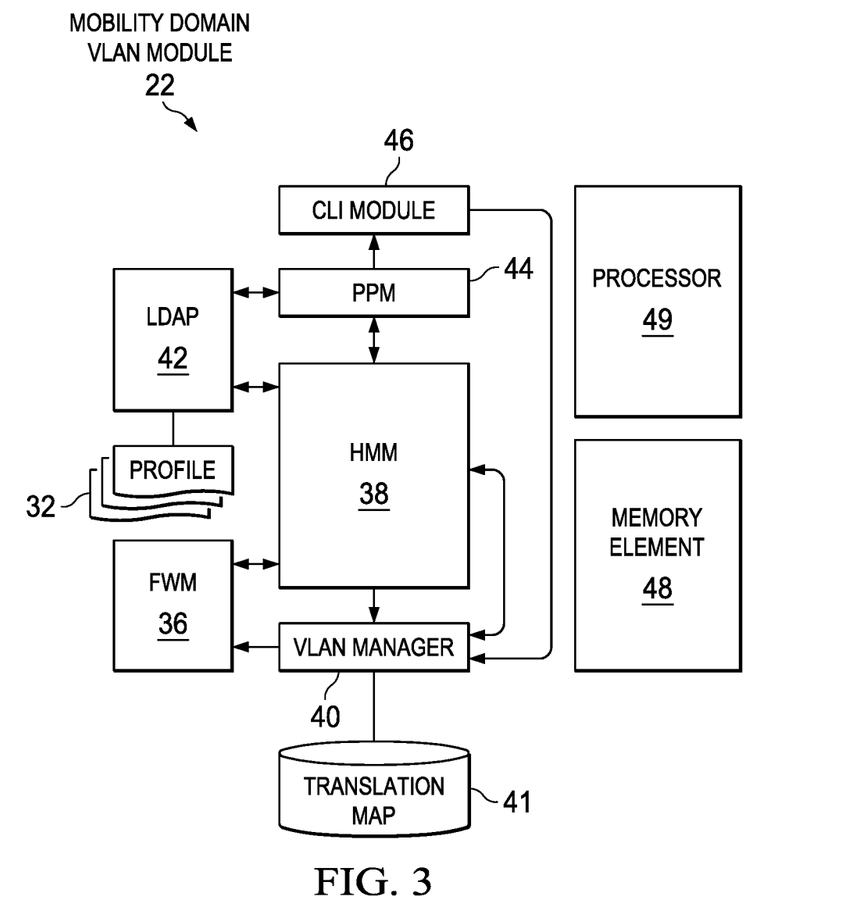
FIG. 3 is a simplified block diagram illustrating other example details of embodiments of the communication system.

Turning to FIG. 3, FIG. 3 is a simplified block diagram illustrating example details of an example mobility domain VLAN module 22 according to an embodiment of communication system 10. A forwarding manager (FWM) 36 may be used to detect the presence of a new tenant (e.g., tenant 1). A Host Mobility Manager (HMM) 38 may request mobility domain and translated VLAN information from a VLAN manager 40. VLAN manager 40 may access a translation map 41 to determine if the original VLAN is to be translated (e.g., original VLAN is within a preconfigured VLAN translation range), and if so, the specific translation. VLAN manager 40 may provide the retrieved parameters to HMM 38.

HMM 38 may retrieve appropriate profile 32 from a suitable database server (e.g., Lightweight Directory Access Protocol (LDAP) server) 42, based on tenant information such as original VLAN provided by FWM 36 and mobility domain information provided by VLAN manager 40. HMM 38 may pass the profile and parameters to a Port Profile Manager (PPM) 44, which parameterizes profile 32 and triggers a CLI module 46 to execute the parameterized profile 32 on associated leaf switch (e.g., 16(1)). A memory element 48 and a processor 49 may facilitate the operations described herein.

Figure 4:
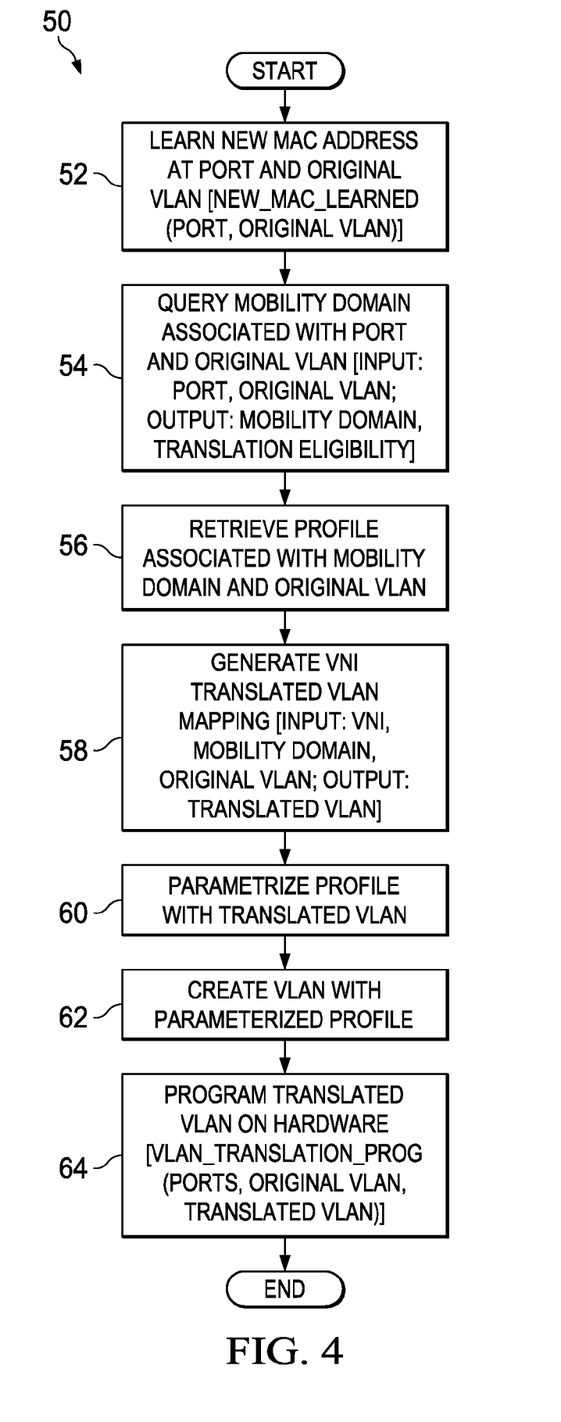
FIG. 4 is a simplified flow diagram illustrating example operations that may be associated with an embodiment of the communication system.

Turning to FIG. 4, FIG. 4 is a simplified flow diagram illustrating example operations 50 that may be associated with embodiments of communication system 10. At 52, FWM 36 may learn a new Media Access Control (MAC) address of a newly attached VM (e.g., VM 18(1)) at a port (e.g., P1) on a leaf switch (e.g., 16(1)), and the original VLAN (e.g., VLAN 10). At 54, HMM 38 may query VLAN manager 40 for the mobility domain associated with the port (e.g., P1) and original VLAN (e.g., VLAN 10) (e.g., input is <port, original VLAN>; output is <mobility domain, translated eligibility). At 56, HMM 38 may retrieve profile 32 associated with the mobility domain and original VLAN.

At 58, HMM 38 may receive from VLAN manager 40 a virtual network interface translated VLAN mapping (e.g., HMM 38 provides virtual network interface (VNI), original VLAN and mobility domain to VLAN manager 40 and receives the translated VLAN in response (e.g., input: <VNI, mobility domain, original VLAN>; output: <translated VLAN>)). At 60, profile 32 may be parameterized with the translated VLAN (e.g., VLAN 100). At 62, the VLAN with the parameterized profile may be created. At 64, the mapping from the original VLAN to the translated VLAN may be programmed on hardware (e.g., appropriate forwarding tables in leaf switch 16(1), by executing a software application programming interface (API) VLAN_TRANSLATION_PROG) with port numbers, original VLAN and translated VLAN)

Figure 5:
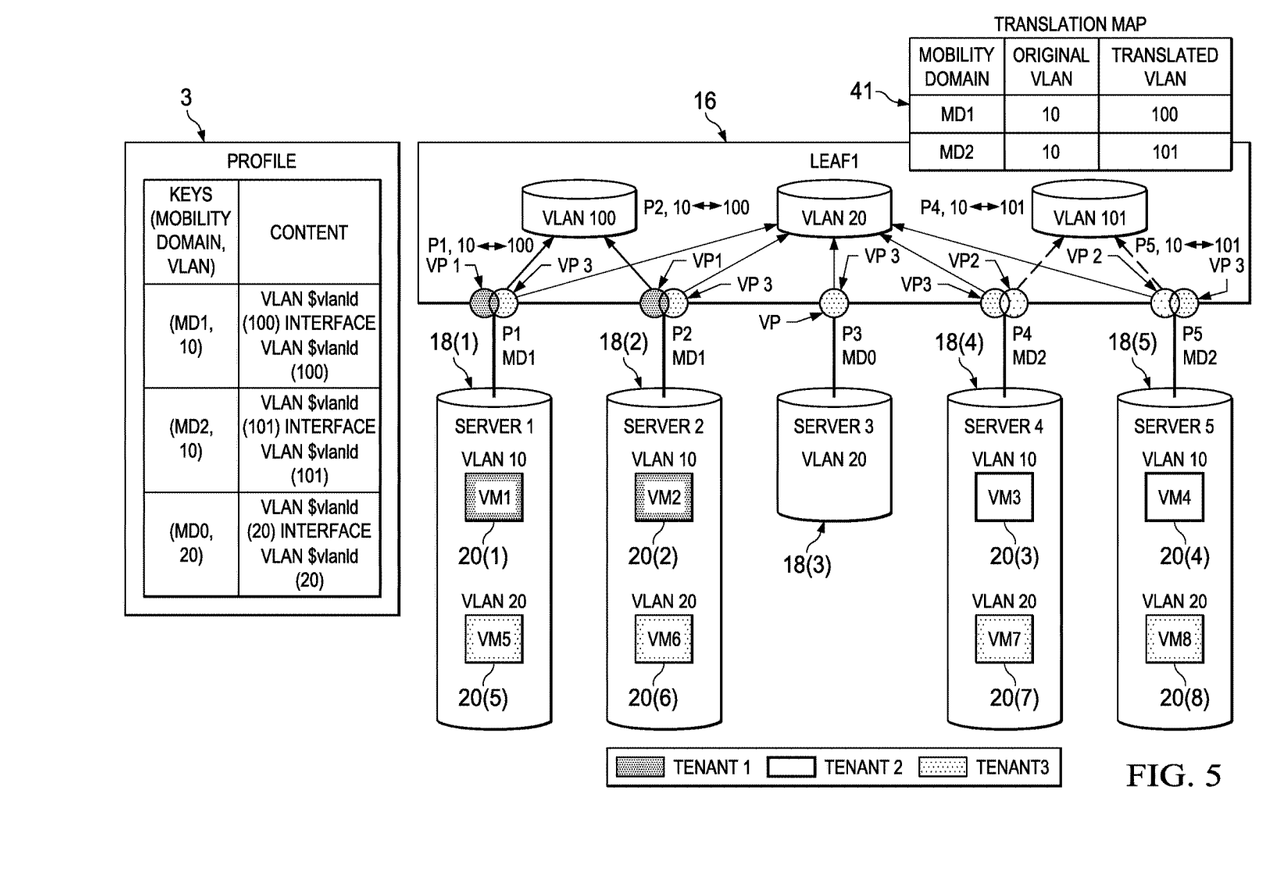
FIG. 5 is a simplified block diagram illustrating yet other example details of embodiments of the communication system.

Turning to FIG. 5, FIG. 5 is a simplified block diagram illustrating example details of an embodiment of communication system 10. Example profile 32 includes a key (e.g., for indexing) comprising a mobility domain ID and VLAN ID, where the VLAN ID is the original VLAN configured on the virtual machine. The corresponding content indicates the parameters relevant to the profile, such as VLAN ID, interface VLAN, etc., which may be parameterized with the translated VLAN. Three example mobility domains are illustrated: per-port mobility domains MD1 and MD2 associated with VLAN 10, and per-device mobility domain MD0, associated with VLAN 20.

Further example details of example leaf switch 16 are also shown, indicating translation map 41, comprising an association between mobility domain, original VLAN and translated VLAN. In the illustrated example, mobility domain MD1 and original VLAN 10 are mapped to translated VLAN 100; mobility domain MD2 and original VLAN 10 are mapped to translated VLAN 101. Thus, VLAN 10 may be mapped to different translated VLANs in different mobility domains. In MD1, VLAN 10 is mapped to VLAN 100 whereas in MD2, VLAN 10 is mapped to VLAN 101. Note that per-device mobility domain MD0 would not be eligible for translation according to the VLAN translation range, and therefore, may not have a corresponding translated VLAN. Therefore, traffic of VLAN 20 belongs to the same broadcast domain, regardless which port it comes from and goes to.

Per-port mobility domain MD1 may be configured on ports P1 and P2 and MD2 may be configured on ports P4 and P5. Therefore, VLAN translation programming in ports P1 and P2 are different from that in ports P4 and P5. Whereas original VLAN 10 is mapped to translated VLAN 100 at ports P1 and P2, original VLAN 10 to translated VLAN 101 at ports P4 and P5. In many embodiments, VLAN manager 40 initiates mobility domain scoped VLAN translation programming at ports P1-P5. Virtual ports VP-1 of translated VLAN 100 may be instantiated on ports P1 and P2 only, and not on ports P3-P5. Similarly, virtual ports VP-2 of translated VLAN 101 may be instantiated on ports P4 and P5 only, and not on ports P1-P3. Virtual ports VP-3 of non-translated VLAN 20 may be instantiated on all ports P1-P5.

Note that for the DCNM network of tenant 1, the corresponding profile may be retrieved through mobility domain MD1 and original VLAN 10. However, the profile content to create VLAN and SVI may be parameterized by using translated VLAN 100, as control and forwarding traffic are on the translated VLAN. The same differentiation may apply to the DCNM network of tenant 2.

Figure 6:
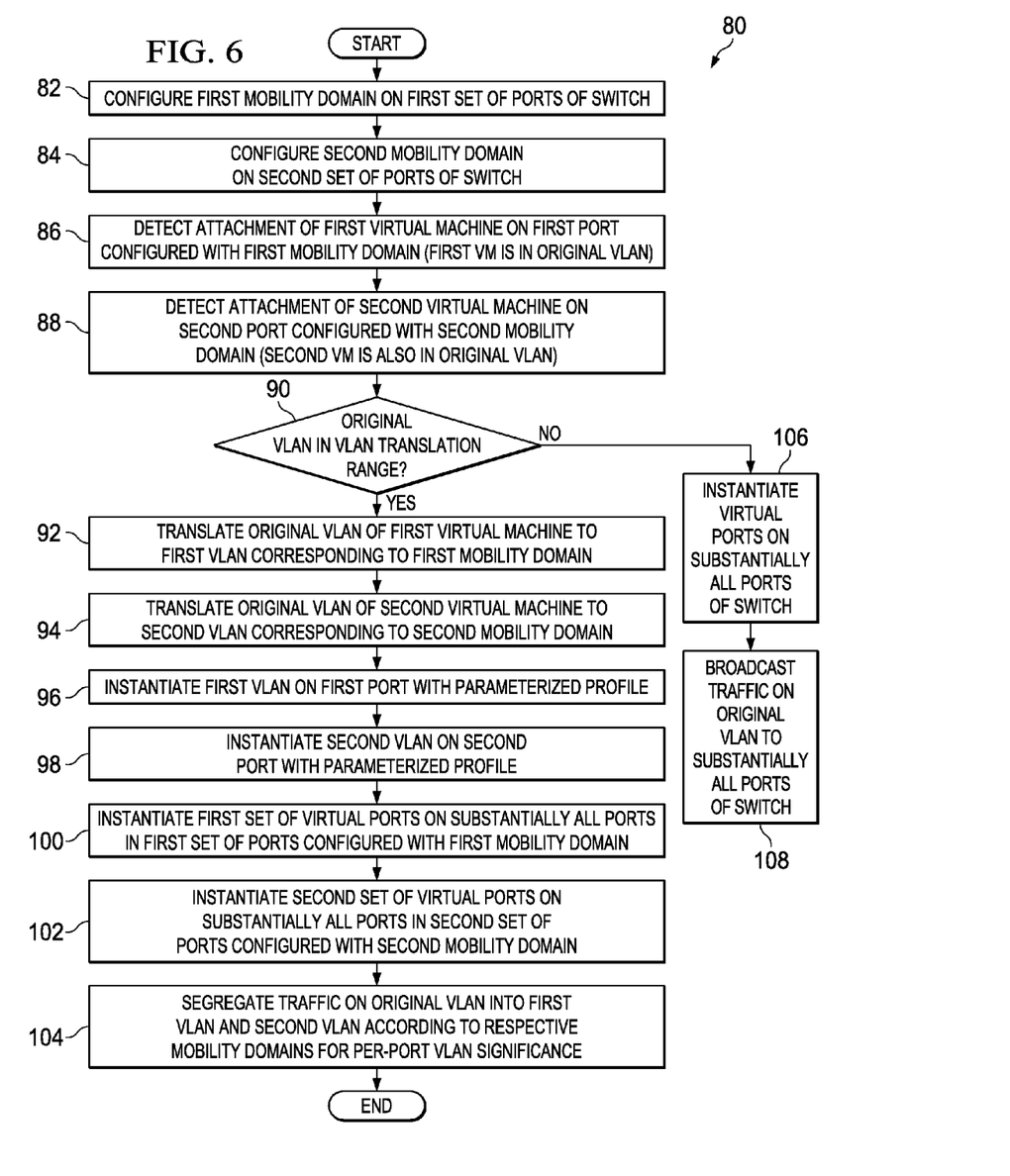
FIG. 6 is a simplified flow diagram illustrating other example operations that may be associated with an embodiment of the communication system.

Turning to FIG. 6, FIG. 6 is a simplified flow diagram illustrating example operations 80 that may be associated with embodiments of communication system 10. At 82, a first mobility domain MD1 may be configured on a first set of ports P1 and P2. At 84, a second mobility domain MD2 may be configured on a second set of ports P4 and P5. At 86, mobility domain VLAN module 22 may detect attachment of first VM 20(1) on first port P1 configured with first mobility domain MD1 and tagged with original VLAN 10. At 88, mobility domain VLAN module 22 may detect attachment of second VM 20(4) on second port P4 configured with second mobility domain MD2 and tagged with the same original VLAN 10.

At 90, a determination may be made whether the original VLAN 10 is included in a pre-configured VLAN translation range. If VLAN 10 is included in the pre-configured VLAN translation range, at 92, original VLAN 10 of first VM 20(1) may be translated to first VLAN 100 corresponding to first mobility domain MD1. At 94, original VLAN 10 of second VM 20(4) may be translated to second VLAN 101 corresponding to second mobility domain MD2. At 96, first VLAN 100 may be instantiated on first port P1 with its profile parameterized for first VLAN 100. At 98, second VLAN 101 may be instantiated on second port P4 with its profile parameterized for second VLAN 101. At 100, a first set of virtual ports may be instantiated on substantially all ports P1 and P2 configured with first mobility domain MD1. At 102, a second set of virtual ports may be instantiated on substantially all ports P4 and P5 configured with second mobility domain MD2. At 104, traffic on original VLAN 10 may be segregated into first VLAN 100 and second VLAN 101 according the respective mobility domains MD1 and MD2 for per-port VLAN significance.

Turning back to 90, if the original VLAN is not included in the pre-configured VLAN translation range, at 106, virtual ports may be instantiated on substantially all ports of leaf switch 16(1). At 108, traffic on the original VLAN may be broadcast to substantially all ports of leaf switch 16(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, mobility domain VLAN module 22. In some embodiments, one or more of these features may be implemented in hardware, provided external to these elements, or consolidated in any appropriate manner to achieve the intended functionality. The various network elements (e.g., mobility domain VLAN module 22) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, mobility domain VLAN module 22 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 48) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 49) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving traffic at a network element in a network environment, the network element comprising a plurality of ports associated with a plurality of mobility domains and virtual local area networks (VLANs), wherein a first VLAN is a per-port significant VLAN associated with a particular per-port mobility domain, wherein a second VLAN is a per-device significant VLAN that is not associated with any per-port mobility domain, wherein the network environment comprises a multi-tenant network and each tenant in the multi-tenant network is associated with a separate mobility domain;
translating the first VLAN to a translated VLAN on a first set of the plurality of ports configured with the particular per-port mobility domain;
when the traffic is associated with the first VLAN, forwarding the traffic to the first set of the plurality of ports via the translated VLAN; and
when the traffic is associated with the second VLAN, broadcasting the traffic to a second set of the plurality of ports on the network element.

2. The method of claim 1, wherein the network element comprises a network device, wherein at least one of the plurality of ports on the network device is configured with both the particular per-port mobility domain and a per-device mobility domain.

3. The method of claim 1, wherein virtual machines associated with different tenants are attached to different ports in the network element, wherein each respective virtual machine is associated with a respective different tenant and attached to a respective different port.

4. The method of claim 1, further comprising identifying a network segment associated with a particular tenant based on the particular per-port mobility domain and the first VLAN, the network segment comprising one of a plurality of network segments of the multi-tenant network.

5. The method of claim 4, further comprising:
retrieving a profile associated with the network segment, the profile indicating the first VLAN;
parameterizing the first VLAN with the translated VLAN for virtual port instantiation according to the profile.

6. The method of claim 1, wherein VLAN translation at the network element is scoped by mobility domain.

7. The method of claim 1, wherein the network environment is divided into segments, each segment being uniquely associated with a specific combination of a mobility domain identifier and a VLAN identifier.

8. The method of claim 1, wherein a translation map specifies VLANs to be translated according to the plurality of mobility domains, wherein a same VLAN identifier associated with different mobility domains is translated to different VLAN identifiers based on respective combinations of the same VLAN identifier and the different mobility domains.

9. The method of claim 8, wherein the translation map is maintained in a VLAN manager, wherein a host mobility manager (HMM) queries the VLAN manager for the translated VLAN.

10. The method of claim 1, wherein traffic associated with the second VLAN belongs to a same broadcast domain, independent of any port in the network element.

11. A non-transitory computer-readable medium storing computer-readable instructions, which when executed by one or more processors, cause a network element associated with the one or more processors to:
  receive traffic at the network element, the network element residing in a network environment and comprising a plurality of ports associated with a plurality of mobility domains and VLANs, wherein a first VLAN is a per-port significant VLAN associated with a particular per-port mobility domain, wherein a second VLAN is a per-device significant VLAN that is not associated with any per-port mobility domain, wherein the network environment comprises a multi-tenant network and each tenant in the multi-tenant network is associated with a separate mobility domain;
  translate the first VLAN to a translated VLAN on a first set of the plurality of ports configured with the particular per-port mobility domain;
  when the traffic is associated with the first VLAN, send the traffic to the translated VLAN on the first set of the plurality of ports; and
  when the traffic is associated with the second VLAN, send the traffic to a second set of the plurality of ports on the network element.

12. The non-transitory computer-readable medium of claim 11, wherein the network element comprises a network device, wherein the second VLAN is associated with a default per-device mobility domain.

13. The non-transitory computer-readable medium of claim 11, wherein virtual machines associated with different tenants are attached to different ports in the network element, wherein each respective virtual machine is associated with a respective different tenant and attached to a respective different port.

14. The non-transitory computer-readable medium of claim 11, storing computer-readable instructions which, when executed by the one or more processors, cause the network element to identify a network segment associated with a particular tenant based on the particular per-port mobility domain and the first VLAN, the network segment comprising one of a plurality of network segments of the multi-tenant network.

15. The non-transitory computer-readable medium of claim 14, storing computer-readable instructions which, when executed by the one or more processors, cause the network element to:
  retrieve a profile associated with the network segment, the profile indicating the first VLAN;
  parameterize the first VLAN with the translated VLAN for virtual port instantiation according to the profile; and
  instantiate, on the first set of the plurality of ports, a virtual port configured with the translated VLAN.

16. A system comprising:
  a network element coupled with a network environment;
  one or more processors; and
  at least one computer-readable storage medium storing computer-executable instructions which, when executed by the one or more processors, cause the system to:
    receive traffic at a network element in a network environment, the network element having a plurality of ports associated with a plurality of mobility domains and VLANs, wherein a first VLAN is a per-port significant VLAN associated with a particular per-port mobility domain, wherein a second VLAN is a per-device significant VLAN that is not associated with any per-port mobility domain, wherein the network environment comprises a multi-tenant network and each tenant in the multi-tenant network is associated with a separate mobility domain;
    translate the first VLAN to a translated VLAN on a port configured with the particular per-port mobility domain;
    when the traffic is associated with the first VLAN, send the traffic to the port via the translated VLAN; and
    when the traffic is associated with the second VLAN, broadcast the traffic to all ports of the network element.

17. The system of claim 16, wherein at least one of the plurality of ports is configured with both the particular per-port mobility domain and a per-device mobility domain.

18. The system of claim 16, wherein virtual machines associated with different tenants are attached to different ports in the network element, wherein each respective virtual machine is associated with a respective different tenant and attached to a respective different port.

19. The system of claim 16, the at least one computer-readable storage medium storing computer-executable instructions which, when executed by the one or more processors, cause the apparatus to identify a network segment associated with a particular tenant based on the particular per-port mobility domain and the first VLAN.

20. The system of claim 19, the at least one computer-readable storage medium storing computer-executable instructions which, when executed by the one or more processors, cause the system to:
  retrieve a profile associated with the identified network segment, the profile indicating the first VLAN; and
  parameterize the first VLAN with the translated VLAN for virtual port instantiation according to the profile.

* * * * *